United States Patent [19]

Huignard et al.

[11] Patent Number: 4,659,223
[45] Date of Patent: Apr. 21, 1987

[54] PHOTOREFRACTIVE CRYSTAL INTERFEROMETRIC DEVICE FOR MEASURING AN ANGULAR ROTATIONAL SPEED

[75] Inventors: Jean-Pierre Huignard, Paris; Hervé Arditty, Marly Le Roi; Claude Puech, Longjumeau, all of France

[73] Assignee: Thomson-Csf, Paris, France

[21] Appl. No.: 667,164

[22] Filed: Nov. 1, 1984

[30] Foreign Application Priority Data

Nov. 4, 1983 [FR] France ................. 83 17586

[51] Int. Cl.⁴ .............................................. G01C 19/64
[52] U.S. Cl. ................................................... 356/350
[58] Field of Search ........................... 356/350; 372/94

[56] References Cited

U.S. PATENT DOCUMENTS

| | | | |
|---|---|---|---|
| 3,581,227 | 5/1971 | Podgorski | 356/350 |
| 4,344,706 | 8/1982 | Ljung et al. | 356/350 |
| 4,396,290 | 8/1983 | Morris | 356/350 |
| 4,405,236 | 9/1983 | Mitsuhashi et al. | 356/350 |
| 4,525,843 | 6/1985 | Diels | 356/350 X |

FOREIGN PATENT DOCUMENTS 0079268 5/1983 European Pat. Off. .
2500937 9/1982 France .

OTHER PUBLICATIONS

"Techniques for Shot Noise Limited Inertial Rotation Measurment Using a Multiturn Fiber Sagnac Interferometer", Davis et al., S.P.I.E., vol. 157, 1978, pp. 131–135.

"Coherent Oscillation by Self-Induced Gratings in the Photorefractive Crystal BaTiO₃", White et al., Applied Physics Letters, 3–1982, pp. 450–452.

"Coherent Signal Beam Amplfication in Two-Wave Mixing Experiments with Photorefractive Bi₂₂ SiO₂₀ Crystals", Huignard et al., Optics Communications, 8-1981, pp. 249–254.

Primary Examiner—Vincent P. McGraw
Assistant Examiner—S. A. Turner
Attorney, Agent, or Firm—Oblon, Fisher, Spivak, McClelland & Maier

[57] ABSTRACT

An interferometric device for measuring an angular rotational speed comprising an amplifying photo refractive crystal placed in the path of optical guide means forming a closed loop. Two signal waves penetrate into said crystal so as to obtain two contrarotating waves of different optical frequencies and of amplitudes restored by amplification in the crystal, moving in said closed loop.

9 Claims, 11 Drawing Figures

PHOTOREFRACTIVE CRYSTAL INTERFEROMETRIC DEVICE FOR MEASURING AN ANGULAR ROTATIONAL SPEED

BACKGROUND OF THE INVENTION

The invention relates to an interferometric device applied to the measurement of an angular rotational speed by using the Sagnac effect.

An interferometer of the prior art comprises mainly a light energy source generally formed by a laser; an optical device formed either by a certain number of mirrors, or by an optical fiber wound on itself, this device forming a wave guide; a device for separating and mixing the light and a device for detecting and processing the detected signal.

In such an interferometer there exist two waves coming from the separator device and travelling in opposite directions over the same optical path.

A fundamental property of ring interferometers is the reciprocity which may be expressed as follows: any disturbance of the optical path affects the waves similarly although these two waves are not subjected thereto exactly at the same time nor in the same direction.

There exist however two types of disturbance which affect the reciprocity.

On the one hand we have disturbances which vary in time, within a lapse of time comparable to the time that the waves take to propagate along the optical path of the interferometer; and on the other hand, so called "non reciprocal" disturbances, i.e. disturbances not having the same effect on the waves depending on whether they are propagated in one direction or in another along the optical path. It is a question of physical effects which destroy the symmetry of the medium in which the waves are propagated.

Two known effects present this latter type of disturbance:

the Faraday effect, or colinear magneto-optical effect, in which a magnetic field creates a preferential orientation of the spin of the electrons of an optical material, and the Sagnac effect, or relativist inertial effect, in which the rotation of the interferometer with respect to a Galilean reference destroys the symmetry of the propagation time. This effect is used for constructing more particularly gyrometers or rate gyros.

In the absence of "non reciprocal" disturbances, the phase difference, which will be called $\Delta\phi$ hereafter, between the two waves which are recombined in the separation and mixing device after travelling over the optical path, is zero. The detection and processing device detects signals representing the optical power of the composite wave obtained after recombination. This power may be broken down in the interferometers of the prior art into two components: a constant component and a component which only exists on the appearance of "non reciprocal" disturbances.

SUMMARY OF THE INVENTION

With respect to this device of the prior art, the proposed device is differentiated therefrom in that it uses an amplifying photorefractive crystal placed inside an optical cavity, for example triangular, and in that two contrarotating waves of different frequencies are propagated in the cavity. This device has then the great advantage of being insensitive to the beams back scattered from the mirrors of the optical cavity and in addition, for each contrarotating wave, the gain provided by the cavity is unidirectional.

The invention provides then an interferometric device for measuring an angular rotational speed, comprising optical guide means forming a closed loop in which two contrarotating waves travel, means for mixing these contrarotating waves and detection means connected to these mixing means, said device further comprising an interactive medium and means for generating an electric field at the confines of this medium, this medium being disposed in the path of the closed loop, a source which delivers two pump waves each interfering in said medium with one of these two contrarotating waves and thus generating interference fringes so as to obtain contrarotating waves having different frequencies, this field being in direction perpendicular to these interference fringes.

BRIEF DESCRIPTION OF THE DRAWINGS

Other features and advantages will appear from the following description with reference to the accompanying Figures in which.

DESCRIPTION OF THE PREFERRED EMBODIMENTS

Figure 1:
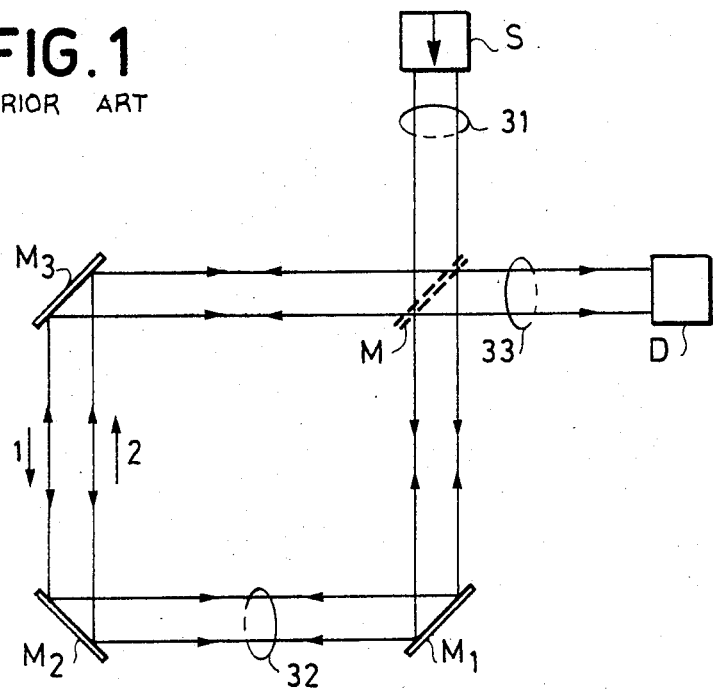
FIGS. 1 and 2 illustrate a device of the prior art.

FIG. 1 shows schematically a ring interferometer of the prior art.

A laser source S produces a beam of parallel rays 31 directed towards a separator device formed by a semi transparent plate or mirror M.

A certain number of mirrors (3 in FIG. 1: $M_1$ to $M_3$) define an optical path forming the ring of the interferometer relooped on the separator device M which also plays the role of a mixing device and thus defines an output branch 33. The emerging beam is then directed towards a device D for detecting and processing the detected signals.

Through the ring travel two waves propagated in opposite directions: one in the clockwise direction (or direction 2), the other in the anticlockwise direction (or direction 1). These two waves are recombined at the separator plate M. The result of this recombination may be observed in the output branch 33.

In the input branch 1 the following equation is verified:

$$P_e = P_{1e} + P_{2e} + 2\sqrt{P_{1e}P_{2e}} \cos(\Delta\phi)$$

In the output branch 33, the following equation is verified:

$$P_s = P_{1s} + P_{2s} - 2\sqrt{P_{1s}P_{2s}} \cos(\Delta\phi)$$

in which $P_e$ and $P_s$ are the optical powers. $\Delta\phi$ is the phase difference between the two waves propagating in opposite directions in ring 32 at the time of recombination. In the absence of "non reciprocal" disturbance, this phase difference $\Delta\phi$ is zero.

If we consider, by way of non limitative example, a particular case of a gyrometer using a ring interferometer a "non reciprocal" disturbance will be created when the gyrometer is set in rotation. In this case, the phase difference $\Delta\phi$ is no longer zero.

The relationship giving $\Delta\phi$ is:

$\Delta\phi = \alpha\Omega$ where $\Omega$ is the speed of rotation and $\alpha$ is a variable given by the relationship:

$$\alpha = k \cdot (L/c)$$

where k is a constant dependent on the geometry of the gyrometer.

L the length of the optical path
$\lambda$ the wave length of the light produced by the laser source S
and c the speed of the light in ring 2.

When the speed of rotation $\Omega$ increases, the phase difference $\Delta\phi$ increases in the same proportions. The optical power $P_s$ in its output branch 33 develops according to a cosinusoidal law.

The sensitivity of the measurement for a given value $\Delta\phi$ is expressed by the derivative of the function $P_s$:

$$\frac{dP_s}{d(\Delta\phi)} = 2\sqrt{P_{1s}P_{2s}} \sin(\Delta\phi)$$

Figure 2:
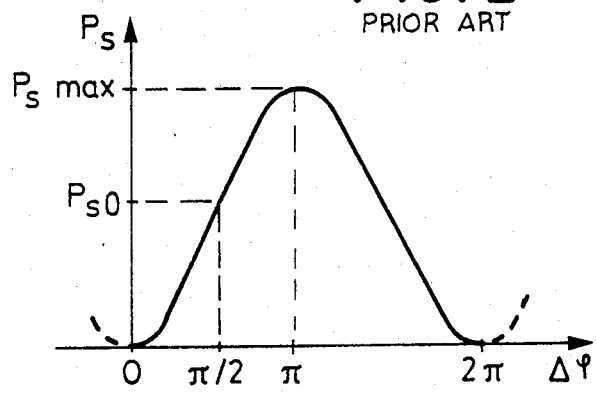

The variation of the optical power in the output branch 2 is illustrated by the diagram of FIG. 2.

It may be considered that the terms $P_{1s}$ and $P_{2s}$ are equal. It follows that, for a phase difference $\Delta\phi = 0$, the power detected is zero. It passes through a maximum $P_{smax}$ for $\Delta\phi$ equals $\pi$ and again through zero for $2\pi$ and so on.

The device of the invention uses coherent amplification by two wave mixing in a photoreflective crystal.

An intense pump wave ($\simeq 10$ mW cm$^{-2}$) interferes with a low strength signal (99 $\mu$Wcm$^{-2}$) in the volume of a photorefractive crystal such as bismuth-silicon oxide (B.S.O.) or barium titanate (BaTiO$_3$), a field $E_o$ being applied perpendicularly to the interference fringes. Considering the self-diffraction effects of the pump wave on the phase network recorded in real time in the crystal, a transfer of energy from the pump wave to the signal wave (parametric amplification) may be inferred. Thus the current transmitted is expressed in the form:

$$I_s = I_{so} \exp[\Gamma - \alpha] \times l$$

with:
$\Gamma$: exponential gain coefficient
$\alpha$: absorption coefficient
l: interaction length of the material The gain $\Gamma$ is related to the maximum index variation $n_s$ by the relationship:

$$\Gamma = 4\pi(\Delta n_s/\lambda)$$

The conditions for obtaining a high value of the gain in BSO crystals are the following:

the recording is provided by a system of interference fringes moving at speed V such that $KV\tau = 1$: $K = (2\pi/\Lambda)$; $\Lambda$ pitch of the strata; $\tau$ time constant for establishment of the network. This results in introducing a spatial shift of $\pi/2$ between the index variation and the illumination network due to the interference fringes (non local response). This interference network at speed V is obtained by translating the frequency of one of the pump or signal waves to a quantity $\delta = 1/2\pi\tau$ the pitch of the strata is chosen about the value $\Lambda \simeq 20$ $\mu$m, which corresponds to the maximum of the gain curve $\Gamma$ as a function of the spatial frequency of the network $\Lambda = \lambda/2\theta$; $2\theta$ being the angle between the two beams interfering on the crystal.

For this spatial frequency, values of $\Gamma$ of the order of 5 to 7 cm$^{-1}$ have been obtained for an applied field of 10 Kvcm$^{-1}$ and $\beta > 10^3$ with $\beta = $Iro/Iso; current ratio of the waves interfering on the crystal. These very high values of the gain allowed on incident signal beam of very low strength to be amplified by 500 [$I_{Ro} \simeq 10$ $\mu$mWcm$^{-2}$; $I_{So} \simeq 10$ $\mu$mWcm$^{-2}$].

The time constant for establishment of the current phenomenon (so the frequency translation $\delta$) depends on the incident current on the pump wave.

In the spectral range $\lambda \simeq 500$ nm, the time constant for establishment of the index change by photo refractive effect in the BSO crystal is given by the relationship:

$$\tau_S \simeq \frac{10^{-1}}{I_{Ro}} I (mW \, cm^{-2})$$

for example:
$I_{Ro} = 10$ mWcm$^{-2}$; $\tau = 10$ ms
$I_{Ro} = 100$ mWcm$^{-2}$; $\tau = 1$ ms The corresponding frequency translation is:

$$\delta = \frac{10}{2\pi} I_{Ro}$$

Example:
$I_{Ro} = 10$ mWcm$^{-2}$; $\delta = 17$ Hz
$I_{Ro} = 100$ mWcm$^{-2}$; $\delta = 170$ Hz
$I_{Ro} = 1$ mWcm$^{-2}$; $\delta = 1.7$ Hz With the amplification conditions thus provided ($\Gamma = 5.7$ cm$^{-1}$; $\alpha \simeq 1$ cm$^{-1}$ for example) oscillation may be obtained by closing the optical path by means of a cavity formed from three mirrors $M_1$, $M_2$, $M_3$ one of which is partially reflecting as shown in FIG. 3.

With the cavity preset, oscillation is initiated on the noise due to the diffusion-diffraction of the components. But the frequency of the wave generated is translated by an amount $\delta$ such that $\delta = 1/2\pi\tau$. This is verified experimentally by causing the incident wave (frequency fo) and the wave in the cavity (frequency fo+$\delta$) to intefere: the result is an interference system moving at the speed V. The frequency translation is also generated by any low frequency vibration of one of the mirrors forming the cavity. The use of a piezoelectric mirror may thus be contemplated for initiating start up of the oscillation.

Figure 3:
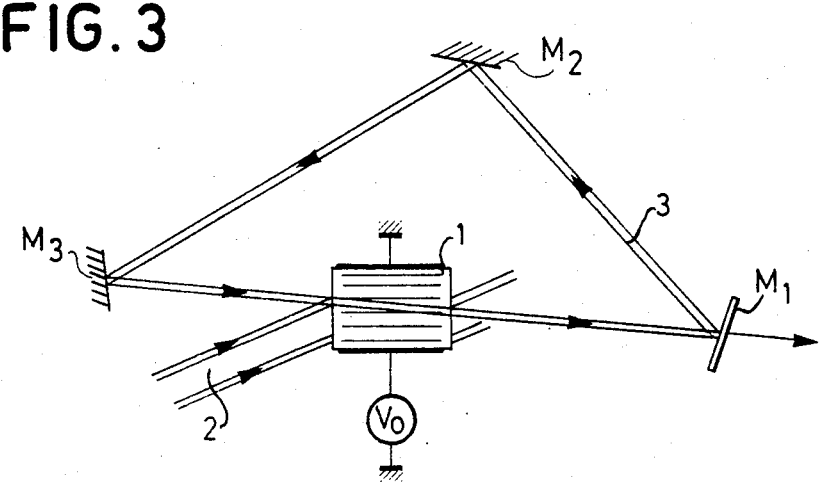
FIG. 3 is a Figure for explaining the operation of the device of the invention.

Taking the properties of the amplifier into account, the gain is only obtained for a wave propagating in a single direction as shown in FIG. 3. The gain is strictly zero for any wave propagating in the reverse direction.

Such a wave interfering with the pump wave 2 creates a defracting structure by "reflection" of pitch $\Lambda=0.1$ μm which is not recorded by the crystal 1.

Figure 4:
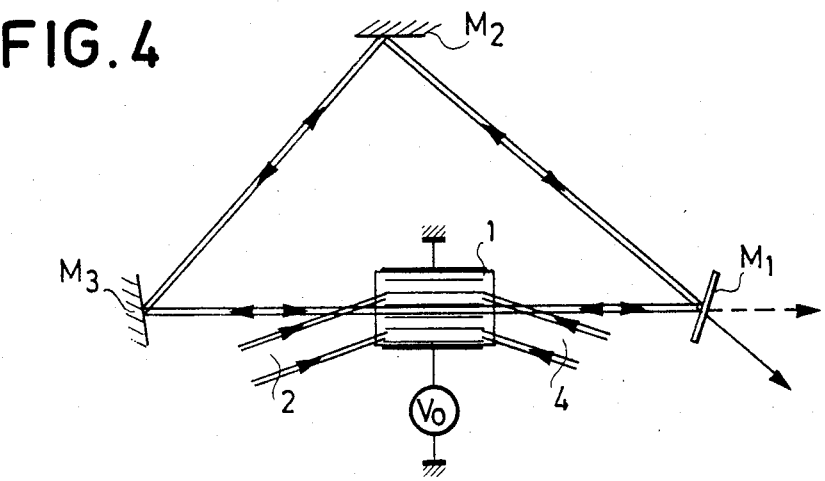
FIG. 4 is a schematical view of the device of the invention.
Figure 5:
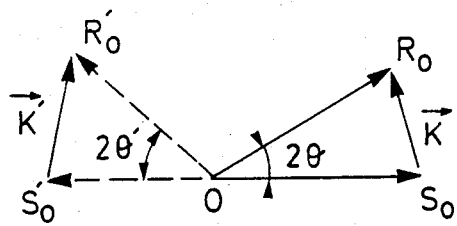
FIGS. 5 to 7 illustrate different aspects of the device of the invention.

As shown in FIG. 4 a contrarotating wave is obtained by adding another pump wave 4 of strength $I_{R'o}$ equal or different to the strength $I_{Ro}$ of the first pump wave 2, this wave generates an oscillation in the cavity at frequency $f_o+\delta$ if $I_{R'o}=I_{Ro}$ or of frequency $f_o+\delta'$ if $I_{R'o} \neq I_{Ro}$. The diagram of the vectors K corresponding to the two independent networks photoinduced in crystal 1 is given in FIG. 5. In this Figure Ro, So and R'o and S'o represent the wave vectors of the waves 3 (So and So') and waves 2 and 4 (Ro and Ro'). It can be seen that the angular senses of $2\theta$ and $2\theta$ are opposite one another, so that the vectors K and K' for energy transfer to the contrarotating waves are both positive.

Figure 6:
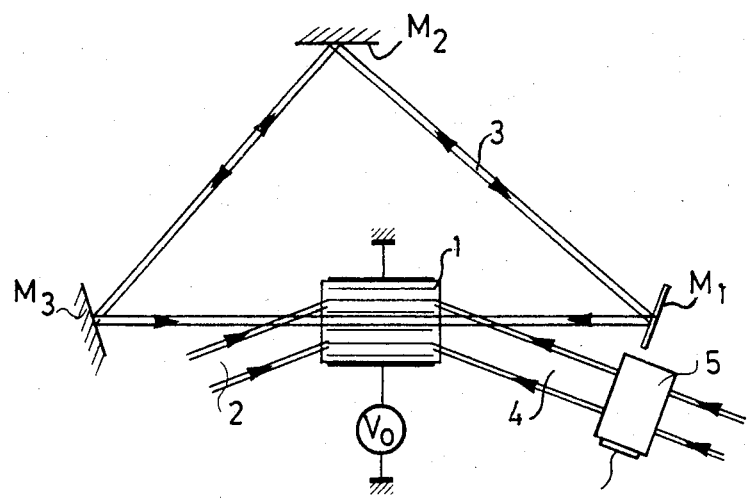
Figure 7:
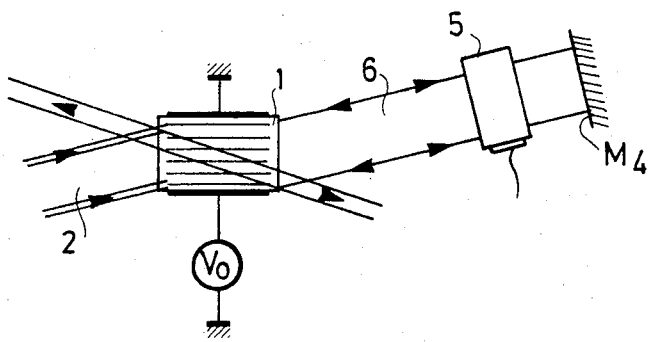

An appreciable frequency translation of the contrarotating wave due to $I_{R'o}$ may be obtained by adding a phase modulator 5 in the beam $I_{R'o}$ or a Bragg cell as shown in FIG. 6. In this latter case, the frequency of the contrarotating wave in the cavity is equal to $f_o+\Delta+\delta'$ if $I_{R'o} \neq I_{Ro}$ or $f_o+\Delta$ if $I_{R'o}=I_{Ro}$. In both cases, two waves of distinctly different frequencies may travel in the triangular cavity. The important consequence for the device is the following: any wave backscattered by the optical components $M_1$, $M_2$, $M_3$ is not amplified after interference with the pump wave since of different frequency and satisfying the condition $\Delta>>1/\tau$; $\tau$=time constant for writing in the network. Another possibility, in so far as generation of the contrarotating wave is concerned, is given in FIG. 7. Reading is effected by a wave antiparallel to the wave $I_{Ro}$ obtained by the means of mirror $M_4$. The frequency of the wave generated is in this case equal to $f_o-\delta'+\Delta$ is $I_{Ro} \neq I_{R'o}$, and $f_o-\delta+\Delta$ if $I_{Ro}=I_{R'o}$.

The two contrarotating waves interfere in crystal 1 so as to give a system of mobile interference fringes parallel to the direction of the applied field. For these two reasons it is not recorded in the photo refractive crystal 1 in the form of a photoinduced index variation. Considering the spatial and time filtering functions of crystal 1, the two main networks alone are recorded therein. The frequency difference between the two interfering beams is respectively equal to $\delta(I_{RO})$ and $\delta'(I_{R'o})$ whose fringes are on average perpendicular to the direction of the applied field.

Figure 8:
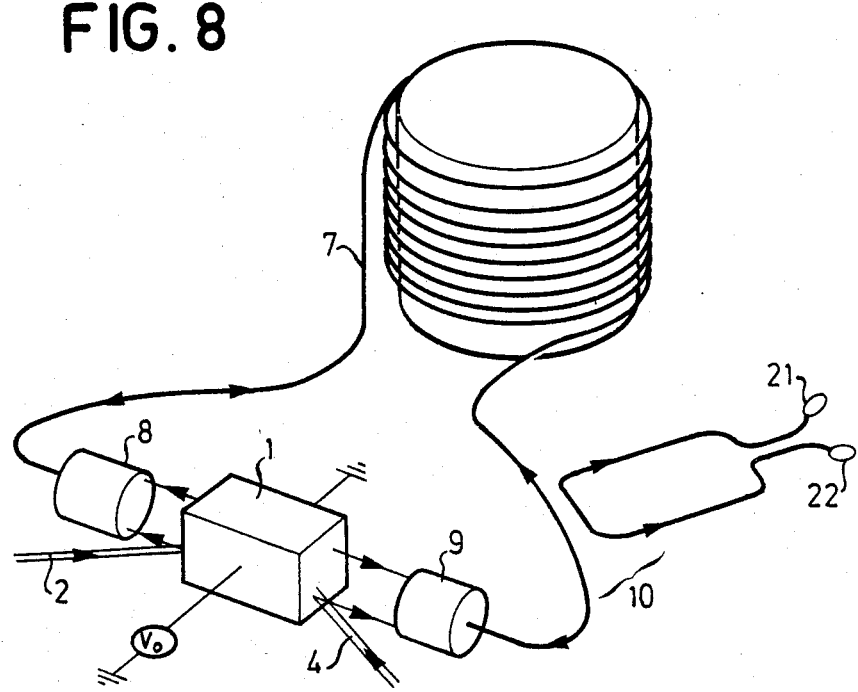
FIG. 8 illustrates a variant of the device of the invention.

Propagation in the cavity defined by mirrors $M_1$, $M_2$, $M_3$ may be replaced by the propagation in one turn or N turns of a coil 7 of monomode optical fiber; two lenses 8, 9 have an index gradient ensuring coupling between the two ends of the fiber; as shown in FIG. 8. Detection is provided by means of a bidimensional coupler 10 connected to the two detectors 21 and 22.

Figure 9:
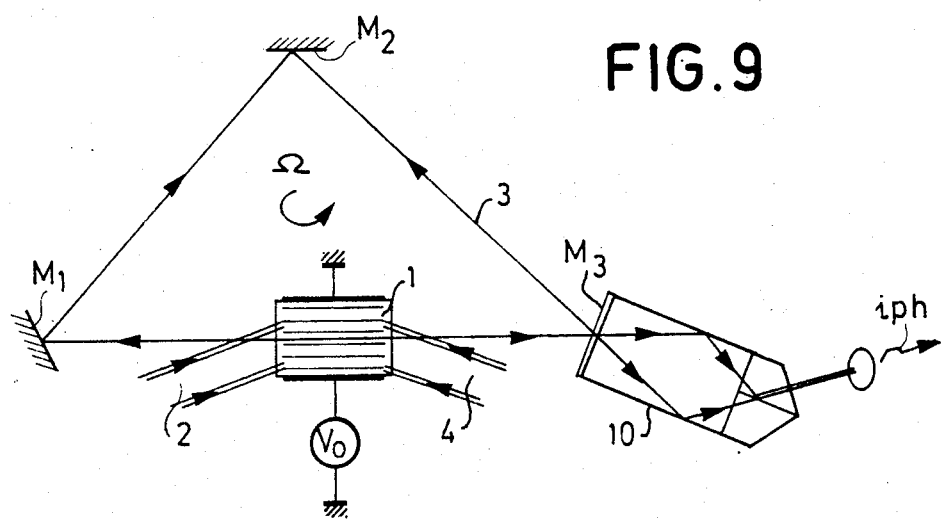
FIG. 9 illustrates one aspect of the device of the invention.

Detection of the angular rotation $\Omega$ may be obtained by causing two beams taken from the contrarotating waves in the cavity to interfere by means of the partially reflecting mirror $M_3$ as shown in FIG. 9.

The induced phase shift is written:

$$\Delta\phi=8/\Delta oC \cdot A \cdot \Omega$$

The useful component of the photocurrent collected after beating of the two waves of different frequency is expressed in the form:

$$iph \alpha \cos(\Delta+\delta'-\delta) \cdot t + \Delta\phi$$

with $I_{Ro} \neq I_{R'o}$ $$iph = \cos(\Delta \cdot t + \Delta\phi); \text{ with } I_{Ro}=I_{R'o}$$

This latter condition is interesting since in this case the frequency of the beat signal is independent of the possible fluctuations of the current $I_o$ of the pump laser.

From measurement of the phase of the signal $\Delta\phi$ so $\Omega$ may be obtained by the relationship:

$$\Omega = \frac{\lambda_o C}{8\pi} \cdot \frac{\Delta\phi}{A}$$

A being the area of the cavity defined by $M_1$, $M_2$, $M_3$. For N turns of monomode fiber:

$$\Omega = \frac{\lambda_o C}{8\pi} \cdot \frac{\Delta\phi}{N \cdot A}$$

Figure 10:
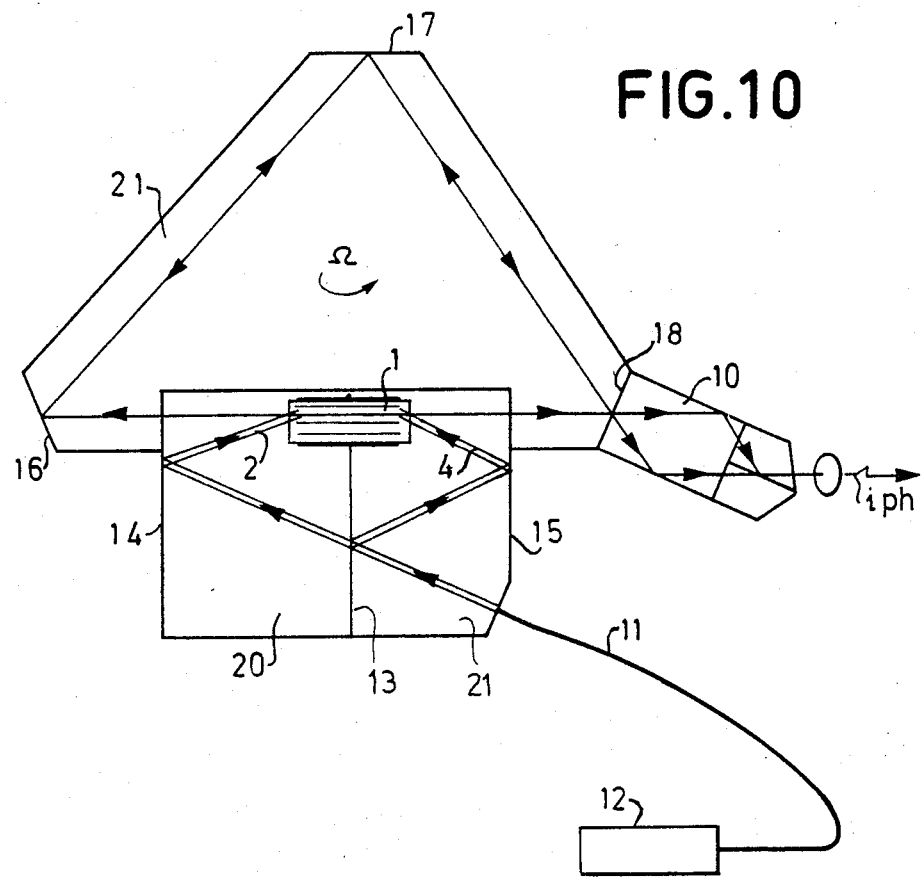
FIG. 10 illustrates one embodiment of the device of the invention.

An example of a compact device for generating the pump waves $I_{Ro}$ and $I_{R'o}$ is given in FIG. 10. The two contrarotating waves are propagated in the cavity formed by a single glass block.

This glass block is formed from three parts which are assembled together:
a first part 20 comprising the crystal 1 and in which beam 11 from a laser 12 is subdivided into two beams 2 and 4 by reflection from a semi reflecting wall 13 and from the two faces 14 and 15,
a second part 21 which forms the cavity properly speaking whose three faces 16, 17, 18 form the three mirrors $M_1$, $M_2$, $M_3$,
a third part 10 for obtaining the detected signal iph.
Thus the device of the invention presents the following advantages:
the gain presented by the cavity is unidirectional
the device is insensitive to the beams back scattered by the mirrors of the cavity. In fact, the two contrarotating waves have different optical frequencies. The frequency translation is controlled by the respective currents $I_{Ro}$ and $I_{R'o}$ of the pump waves,
the two networks written into the photorefractive medium are independent. There is thus no coupling of modes between the contrarotating waves.

The device of the invention could just as well be formed by integrated optics with optical wave guides.

Figure 11:
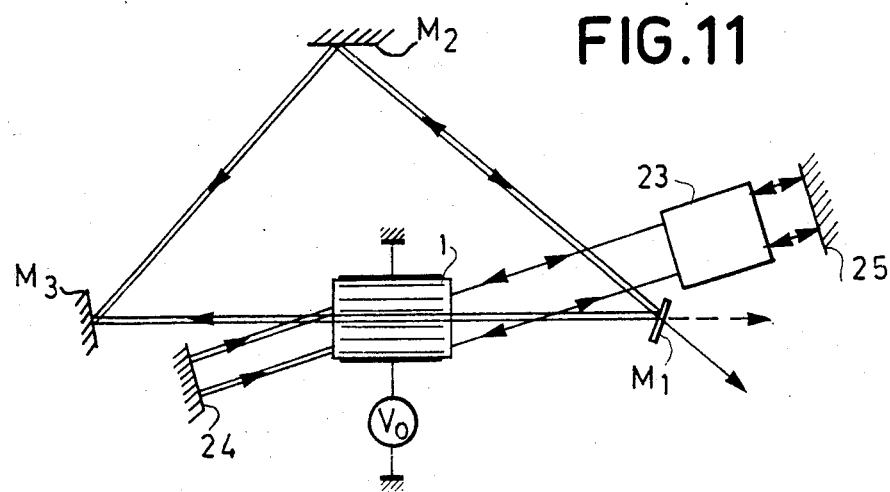
FIG. 11 illustrates a variant of the device of the invention.

FIG. 11 shows a variant of the device of the invention. Medium 1 is disposed in a laser cavity for generating the pump waves, with amplifying medium 23 and the two mirrors 24 and 25 which define this cavity.

What is claimed is:
1. An interferometric device for measuring an angular rotational speed, comprising:
optical guide means forming a closed loop in which two contrarotating waves travel;
a photorefractive crystal disposed in the path of a leg of said closed loop;
means for generating an electric field in said photorefractive crystal;
means for interfering two opposed pump waves with said contrarotating waves in said photorefractive crystal, said opposing pump waves being non-colinear and angled with respect to said path at said leg by angles having opposite senses, whereby energy is transferred from said pump waves to said contrarotating waves;
means for mixing said contrarotating waves; and
means for detecting said mixed waves.

2. The device as claimed in claim 1, wherein said guide means comprise at least three flat mirrors whose reflecting surfaces are disposed towards the inside of the loop, one of said mirrors being a semi transparent mirror.

3. The device as claimed in claim 2, wherein one of said mirrors is a mirror made from a piezoelectric material.

4. The device as claimed in claim 1, wherein said guide means comprise an optical fiber.

5. The device as claimed in claim 1 including a phase modulator disposed in a path of one of said pump waves before said pump wave reached said crystal.

6. The device as claimed in claim 1, wherein said crystal is disposed in a laser cavity.

7. The device as claimed in claim 1, wherein said crystal is a bismuth-silicon oxide crystal.

8. The device as claimed in claim 1, wherein said crystal is made from barium titanate.

9. The device of claim 1 wherein said means for interfering comprise:
a laser; and
a prism including surfaces positioned for splitting a beam from said laser and directing said split beam into said crystal to form said pump waves.

* * * * *